United States Patent [19]

Wilson

[11] 3,833,933

[45] Sept. 3, 1974

[54] ANALOG METER DISPLAY AND APPARATUS FOR SIGNAL GENERATION THEREFOR

[75] Inventor: Wayne Wilson, Bountiful, Utah

[73] Assignee: Beehive Medical Electronics, Inc., Salt Lake City, Utah

[22] Filed: Aug. 28, 1972

[21] Appl. No.: 284,124

[52] U.S. Cl......... 340/324 R, 340/166 EL, 340/336
[51] Int. Cl. .............................................. G09f 9/34
[58] Field of Search........ 340/168 S, 324 R, 324 M, 340/336, 166 EL

[56] References Cited
UNITED STATES PATENTS

| | | | |
|---|---|---|---|
| 3,225,342 | 12/1965 | Clark | 340/168 S |
| 3,343,155 | 9/1967 | Pahlavan | 340/336 |
| 3,525,091 | 8/1970 | Lally | 340/324 R |

Primary Examiner—John W. Caldwell
Assistant Examiner—Marshall M. Curtis

[57] ABSTRACT

An array of lights arranged as a display to reflect an electronic signal generating occurrence. Binary information, in a form such as the phase angle of an electronic signal, is fed into shift registers, a number of decoder matrixes, or to similar digital to position converter apparatus. The incoming signal is converted to energize a number of lights in the array of lights such that the position and arrangement of the energized lights reflects the input signal. A satisfactory arrangement of an array of lights has been found to be two parallel rows of adjacent lights, with lights of one row staggered between the lights of the other row. An incoming electrical signal is reflected by energization of three adjoining lights, two in one row and one in the other, to produce a triangular pointer, with the single energized light pointing to a value indicative of the incoming electrical signal.

6 Claims, 4 Drawing Figures

ANALOG METER DISPLAY AND APPARATUS FOR SIGNAL GENERATION THEREFOR

BRIEF DESCRIPTION OF THE INVENTION

1. Field of the Invention

This invention relates to electronic display and driving apparatus therefor.

2. Prior Art

Meters, mechanical pointers, dial displays, and similar display arrangements used to reflect a measured electronic signal input, have long been known. However, the accuracy of such display apparatus is inherently limited by mechanical inertia, bearing wear, friction, and mechanical inconsistencies. Such accuracy limiting factors are also not constant, with the accuracy of a given display arrangement changing with time and use, such that periodic calibration of the display is required. Prior display systems and especially those with which I am familar that are currently on the market are inherently slow, since they require the transformation of an electronic signal to a mechanical movement to produce a readout.

Although electronic apparatus has been used to illuminate moving mosaic display signs and information display arrangements, the ones with which I am familar have involved bar graphs or point displays and have not provided a movable pointer adaptable to indicating changing conditions.

Speed and accuracy limitations, which are inherent in mechanical display arrangements, are not significant factors in the system of the present invention which utilizes an arrangement of lights some of which are illuminated at a given time by a suitable electric signal driver apparatus.

SUMMARY OF THE INVENTION

It is a principal object of the present invention to provide an analog light display of an electronic occurrence that operates accurately and rapidly with a high degree of reliability.

Principal features of the present invention include an array of lights arranged as adjacent lines, rings, sinusoidal, or other shapes in staggered or in line configuration. The light display is combined with a circuit arrangement wherein an input electrical signal is decoded or modified to produce output signals to light a plurality of lights in the light array. The illuminated lights in the array are arranged to form a pointer with the pointed end thereof indicating a value representative of the input electrical signal.

Light emitting diodes, LED's, because of their long life, speed of operation and reliability, have been found to be excellent light sources and presently are preferred for use in the array of lights of the invention.

To provide multiple light illumination in the array of lights, so as to form a pointer indicating the value of an input signal, an arrangement of parallel shift registers is loaded with impulses that will illuminate a pointer pattern. The impulses are rapidly shifted through the shift registers to the display location to light the appropriate ones of the lights or LED's used. An electrical input circuit generates corresponding shift pulses that drive the shift registers to position the pointer. The input signals generated illuminate a programmed plurality of lights such that a pointer of lights or LED's is formed, the pointed end of which is directed towards a read out scale to indicate a value that is representative of the electrical input value.

An arrangement of multiple decoder circuits may alternatively be used to provide multiple light illumination in the array of lights. The light pointer illumination signals generated therein appear the same as those provided by using shift registers, but, since the flip flop circuitry of the shift registers is not used less time is required for the input signals transformed into the light array to reach a steady state.

Circuits are provided to move an electrical signal past the limited ranges of blocks of shift registers or double decoders, to provide the analog dial light display range capability needed.

Additional objects and features of the invention will become apparent from the following detailed description and drawings disclosing what is presently contemplated as being the best mode of the invention.

THE DRAWINGS

FIG. 1 is a front view of a preferred embodiment of an array of lights consisting of two adjacent arcuate rows of lights, with the lights of one row staggered to be between the lights of the other row;

FIG. 2, a schematic of a decode matrix and driver circuit that transforms an electrical input signal into pulses which energize a pattern of lights in the array of lights;

FIG. 3, a schematic of a decode matrix composed of shift registers that convert a digital input signal into a plurality of analog output signals to energize lights in the array of lights; and FIG. 4, a schematic of another decode matrix made up of decoders and arranged to perform the same function as the decode matrix of FIG. 3.

DETAILED DESCRIPTION

Figure 1:
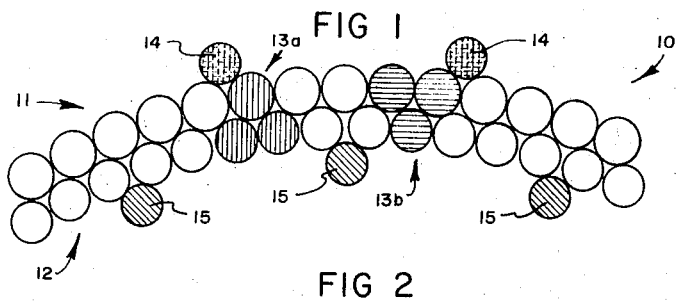

Referring now to the drawings:

In the embodiment of FIG. 1, an array of lights, shown generally at 10, consists of two arcuate rows 11 and 12 of lights, with the lights of each row arranged closely adjacent and with the lights in one row staggered by approximately one-half of the lights spacing of the other row. It should be apparent that more than two rows of lights could be employed, or that the lights could be arranged in lines or in a variety of configurations other than the arcs shown. For example, one arc or row of lights could be employed alone, but such an arrangement would be less reliable because of the possibility that burned out or defective lights existing in the display would invalidate readings obtained therefrom.

Two triangular groupings of energized lights are shown in FIG. 1. The triangular grouping shown at 13a illustrate the lighting of two lamps in the lower arc of lights and one in the upper arc to form an outwardly pointing triangle of lights. In the grouping shown at 13b two lights in the upper arc of lights and one in the lower arc are illuminated to form an inwardly pointing triangle of lights. It should also be apparent that the staggering of light spacing could be eliminated, with aligned adjacent lights in the upper and lower arcs being illuminated to form a line or bar pointing inwardly or outwardly. Marker lights, shown at 14 and 15 that are continuously illuminated in the display to mark incremental voltage values, phase angles, or the like, aid in reading the value output indicated by the pointer. Marker lights 14 are included in the display as reference points for the triangle of lights 13a and marker lights 15 are reference lights for triangle 13b. Depending on the reference triangles used, marker lights 14 or 15 may or may not be used. In practice, the values actually pointed at will, of course, be dependent on the nature of the display.

More than one input signal can be introduced into the array of lights with the lights illuminated by one of such signal inputs flashed or blinked, for example, to distinguish the values displayed. Many lighting arrangements, configurations, and numbers of lights could be used to produce the analog meter display of the invention, with the invention residing in the use of an array of lights driven electrically to produce a visual analog positioned marker for readout of an input electrical signal.

Figure 2:
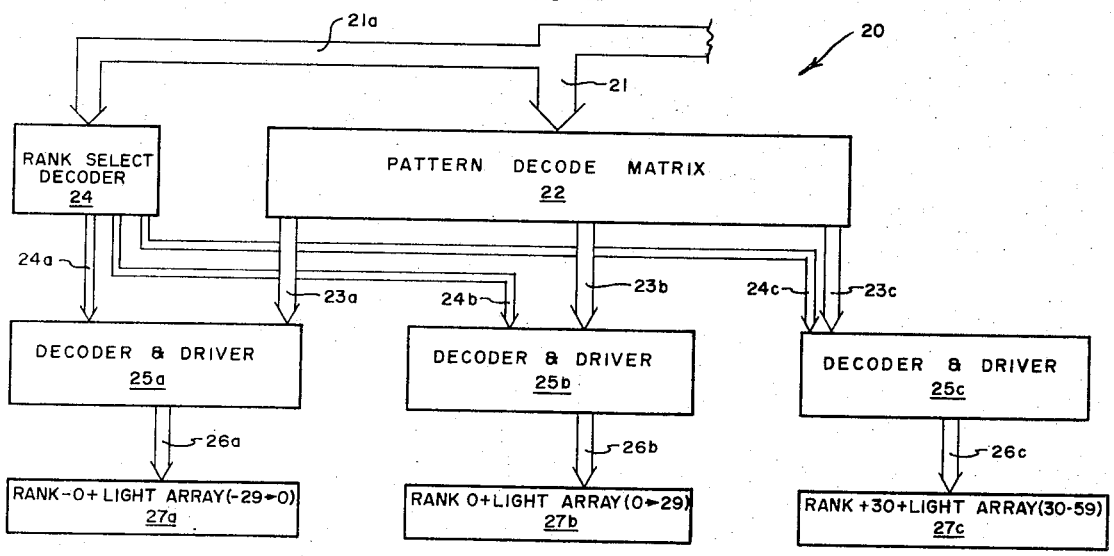

FIG. 2 illustrates a block schematic diagram 20 of electrical driver logic circuitry for converting an electrical input into a plurality of electrical signals that illuminate a pointer in the array of lights of FIG. 1. Digitally coded electrical information is fed into the system as shown by input arrow 21. A pattern decode matrix 22 receives the coded information, and produces patterned signals. Arrows 23a, 23b and 23c represent the coded input signals moving from the pattern decode matrix 22 into decoder drivers 25a, 25b or 25c, respectively, wherein a pointer pattern of the signals produced by the input is made. A rank select decoder 24 receives the digitally coded information fed into the system through a leg 21a that extends from the input arrow 21, to selectively produce enabling signals that move, as shown by arrows 24a, 24b and 24c, to the decoder and drivers 25a, 25b and 25c. When triggered by signals from the rank select decoder 24, signals move from one or more of the decoders and drivers 25a, 25b and 25c, as shown by arrows 26a, 26b and 26c, to operate light arrays 27a, 27b and 27c. Each light array (FIG. 2) thus represents a rank of values. Light array 27a has a rank of (−29 → 0), 27b is (0 → 29), and 27c is (30 → 59). The signals to light a given value in a light array are produced by the pattern decode matrix 22, and the selection of a particular rank of values is made by the rank select decoder 24 triggering a selected decoder and driver 25a, 25b or 25c. Obviously, additional light arrays operating in other rank ranges could also be employed, with the enlarged capacity only requiring changes in the numbers of repeat circuits used.

Figure 3:
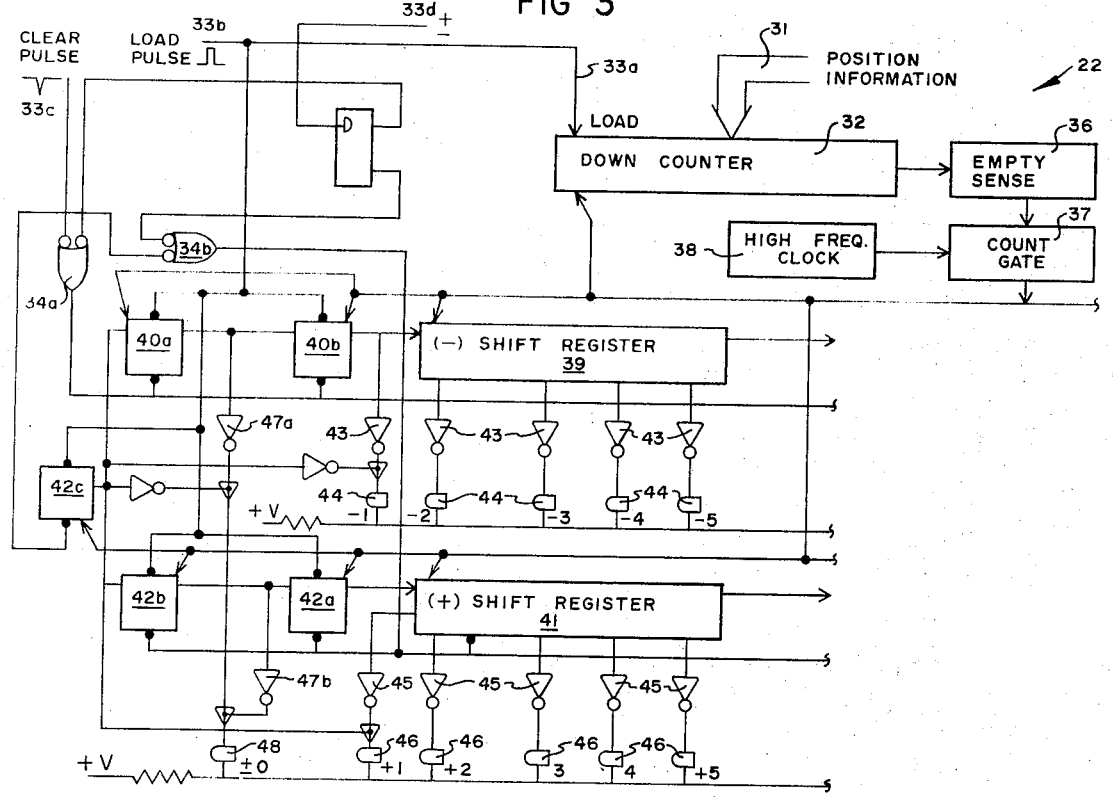

FIG. 3 is a schematic diagram of a shift register embodiment of the pattern decode matrix 22 shown in block form in FIG. 2. As shown, the application of an input load pulse simultaneously to both a positive and negative shift register produces an output reflecting a pointer pattern at home position. Digital coded position bits, illustrated by arrow 31, are fed into a down counter 32 which is loaded with the position bits entering through line 33b and a clear pulse entering in line 33c that has just cleared a number of conventionally arranged flip flops and shift register elements, not shown, in the circuit. The clear pulse entering through line 33a, along with a positive or negative sine pulse shown at 33d, moves to gates 34a and 34b. A count gate 37 provides signals to the flip flops and shift registers within the circuit. The signals from count gate 37 shift the signal generated within the shift register of the pattern decode matrix 22 to illuminate a higher rank of light arrays when the signal is above a defined magnitude. For the purposes of this description, it is assumed that the signal magnitude is within the range of values of the shift registers of the pattern decode matrix 22.

From the down counter 32 the input state signal flows through impulse sensing circuitry consisting of an empty sense decoder 36, which decoder 36 is activated by a counter output state signal transmitted with the code position bits and a count gate 37. A high frequency clock 38 provides a pulse input to the count gate 37 such that the output pulses therefrom are timed reflections of the electrical position input signal illustrated by arrow 31. Signals from the count gate 37 move to (−) shift register 39, to flip flops 40a and 40b, to (+) shift register 41, and to flip flops 42a, 42b and 42c. Flip flops 42c, 40a and 40b transfer the pointer pattern to the (−) shift register 39 to cause a pattern shift as count gate 37 pulses are received. Similarly, the pattern signal to the (+) shift register 41 moves through flip flops 42a and 42b and to 42c. Output from the (+) shift register 41 moves through one of the inverters 45 to one of the light array drivers 46 and the output from the (−) shift registers 39 moves through one of the inverters 43 to one of the light array drivers 44.

As signals move through the shift registers, a signal from the count gate 37 simultaneously is applied through the flip flops 40a, 40b, 42a and 42b, and through inverter 47a and 47b, to emerge at 48 as a control signal reflective of the signal input. The character of the signals discharged at 48 and from the light array drivers 44 and 46 determines the specific lights of an array of lights such as that shown at 10 in FIG. 1, that are energized to form a triangular pattern of lights pointing at the value representative of the input electrical signal. Different arrangements and numbers of shift register circuits could of course be employed to accommodate different arrangements and magnitudes of light arrays than that described to illuminate the light array shown at 10.

Figure 4:
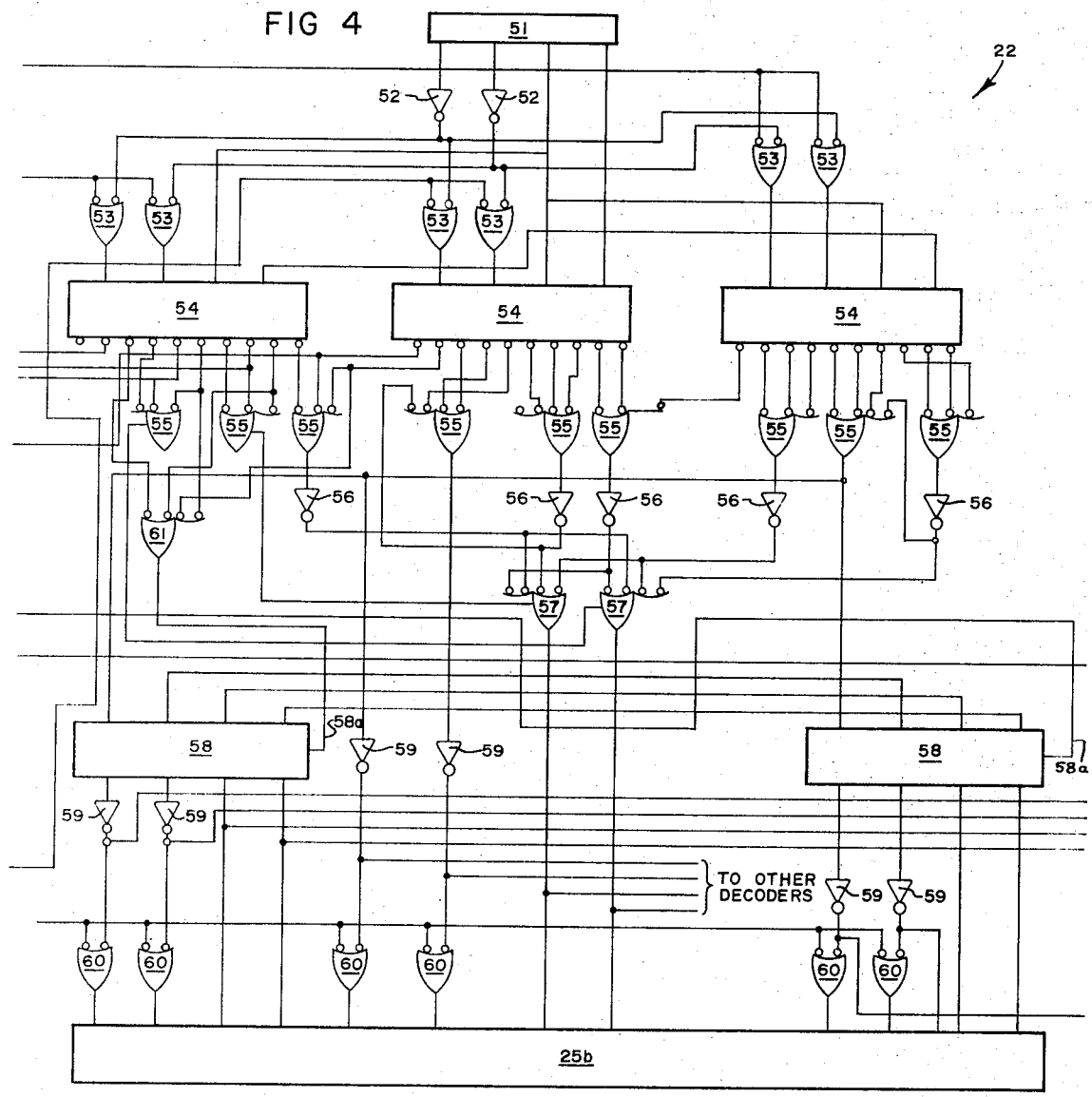

FIG. 4, illustrates a block schematic of a grouping of multiple decoder drivers forming another embodiment of the pattern decode matrix 22 connected to the decoder and driver 25b. As shown in FIG. 4, a binary input signal is fed into the decode matrix 22 at input 51. Inverter gates 52 receive the most significant bits of information from input 51 translating the information into a pattern that is usable by the decoders 54. Code gates 53 are interposed between the decoders 54 and inverter gates 52 to code the information received therein for passage into the decoders 54. The decoders 54, shown in FIG. 4, provide decode patterns. In the event the signal received from input 51 is outside the capability of the decoder and driver 25b, which ultimately receives the signals generated by the decoders 54, it will be so determined by a rank select decoder 24, of the type shown in FIG. 2, and a shift to a similar decoder matrix having suitable capacity will occur. For purposes of this explanation it is assumed that the signal input is within the capability of the decoder and driver 25b. Each decoder 54 has a capability of handling 10 bits, and generating a three dot or pulse output consists of a center dot, or pulse, reflective of the signal input with dots or pulses of either side thereof.

The three dot or pulse signal generated in a decoder 54 passes through code gates 55 wherein the signals are combined to produce most and least significant bits for further modification by four bit adders 58. The three dot or pulse output of a decoder 54 is also arranged to pass through inverter gates 56 and code gates 57 to provide coded signals directly to the decoder and driver 25b and to provide signals to other rnaks of pattern decoders. Inverter gates 56 and code gates 57 are used to shift signals to another pattern decode matrix of the same type herein described.

The three dot pattern generated by a decoder 54 passes through encoding gates to the four bit adders 58 and through inverter gates 59 and code gates 60. The four bit adders 58 also feed to code gates 60, the outputs of which are connected to 30 bit decoders of the decoder and driver 25b.

The four bit adders 58 are each arranged to receive information through four inputs and a fifth adder circuit 58a. Each adder circuit 58a receives a signal from a code gate 61 connected to decoders 54, which signal adds a +1 into the associated adder. The addition is reflected in the signal output going from the adder to decoders in the decoder and driver 25b. The decoders therein are arranged to drive the lights in light array 27b, FIG. 2, such that signals received from the four bit adders 58 cause a leaping signal shift output from the decoders of the decoder and driver 25b. The leaping signal shift causes the signal illuminating a lamp with a lesser signal value to be extinguished and a lamp having a signal one value greater than the greatest signal value of an illuminated lamp to be lighted. Should the signal input decrease, the lamp illuminated by the largest signal value is extinguished, and a signal having a value that is one less than that of the least valued illuminated lamp, flows from the decoder to the lamp having the next lowest signal value. The combination of four bit adders 58 and decoders in the decoder and driver 25b therefor provides signal shifting while involving a minimum number of lamp illuminations and extinguishments. A display is provided that rapidly reflects input signal changes but which will move rapidly to a steady state.

The decoders of the pattern decode matrix and decoder driver, upon receipt of an input signal, instantly produce output signals to illuminate appropriate lamps in the light array. Unlike the shift register decode matrix of FIG. 3, which translates a signal input to a multiple signal output through flip flop circuitry, the signals generated by the decoders are almost instantaneous and therefor may be more desirable for use as the pattern decode matrix and decoder driver for some purposes.

The schematics of a shift register and multiple decoder drivers shown in the schematic diagrams of FIGS. 3 and 4, are illustrative of two approaches used to generate multiple signals from a single signal input. Other circuit arrangements can be used for the same purpose and certainly the shift register and the multiple decoder driver arrangements could be modified from the arrangements herein disclosed.

It should be obvious that a number of driver logic means, involving either shift registers, decoder drivers, or like circuits, could be employed and connected to the array of lights to produce visual indications of a plurality of electrical occurrences. Such an arrangement would, of course, require that some distinguishing identification means, such as a pulsing arrangement, be incorporated into the signals generated to enable an observer to distinguish one signal input from another.

Although a preferred form of my invention has been herein disclosed, it is to be understood that the present disclosure is by way of example and that variations are possible without departing from the subject matter coming within the scope of the following claims, which subject matter I regard as my invention.

I claim:

1. An analog meter display and apparatus for signal generation thereof comprising
   a marker arrangement;
   an array of lights coextensive with and fixed relative to said marker arrangement, said array including at least two adjacent rows of lights, with the lights in one row being staggered by approximately one-half of the light spacing of the other row; and
   electrical driver means for converting a measured characteristic of an input electrical signal to be displayed into a plurality of electrical signals that respectively illuminate a selected plurality of the lights in said array in a selected pattern to thereby form a pointer which points relative to the marker arrangement to specify the value of the measured characteristic.

2. An analog meter display and apparatus for signal generation thereof as recited in claim 1, wherein said driver means includes
   a plurality of driver logic means, each coupled to a different grouping of lights in said array, and
   a rank select decoder means connected electrically to the input electrical signal for determining the order of magnitude of said input electrical signal and for selecting a proper one of said driver logic means to produce and display a pattern in the corresponding light array grouping.

3. An analog meter display and apparatus for signal generation thereof as recited in claim 1, wherein the electrical driver means consists of
   a circuit containing impulse sensing and clock means;
   a circuit containing flip flop means, said flip flop means receiving signal pulses directly from said circuit containing impulse sensing and clock means; and
   shift register means connected electrically to receive a number of electrical signal pulses directly from said circuit containing impulse sensing and clock means and from said circuit containing flip flop means, for transmitting said signal pulses, as a pattern of pulses in a signal output from said shift register means, to illuminate a patterned plurality of lights in the array of lights.

4. An analog meter display and apparatus for signal generation thereof as recited in claim 1, wherein the electrical driver means consists of
   a circuit containing inverter gate means and code gate means;
   a decoder matrix means, connected electrically to receive a number of electrical signal pulses directly from said circuit containing inverter gate means and code gate means, for transmitting an electrical signal pattern therefrom;
   four bit adder means connected electrically to receive said electrical signal pattern from said decoder matrix means, for supplying a pulse pattern code to said electrical signal pattern and transmitting said modified electrical signal pattern therefrom; and a second decoder matrix means, connected electrically to receive said modified electrical signal pattern from said four bit adder means to provide output electrical signal pulses to illuminate a pattern of lights in the array of lights.

5. An analog meter display and apparatus for signal generation thereof as recited in claim 1, wherein the pointer formed in said array is triangular.

6. An analog meter display and apparatus for signal generation thereof as recited in claim 5, wherein the pointer formed in said array selectively points in either direction laterally of said rows of lights.

* * * * *